United States Patent [19]
Friedman

[11] 3,776,453
[45] Dec. 4, 1973

[54] AUDIENCE RESPONSE MEASUREMENT METHODS AND APPARATUS

[76] Inventor: Warren W. Friedman, 705 Olive St., St. Louis, Mo. 63101

[22] Filed: Sept. 29, 1972

[21] Appl. No.: 293,466

[52] U.S. Cl............ 235/52, 346/33 ME, 128/2.1 R, 179/2 AS
[51] Int. Cl....... G07c 13/00, G01d 9/00, A61b 5/16
[58] Field of Search.................... 235/52; 346/33 R, 346/37, 33 ME; 179/2 AS; 128/2.1 R, 2.1 A

[56] References Cited
UNITED STATES PATENTS

| | | | |
|---|---|---|---|
| 2,547,074 | 4/1951 | Cirlin | 346/74 E |
| 2,712,976 | 7/1955 | Blaustein et al. | 346/33 R |
| 3,034,500 | 5/1962 | Backster, Jr. | 128/2.1 R |
| 3,378,194 | 4/1968 | Wells | 235/52 |
| 3,390,397 | 6/1968 | Friedlander | 346/33 ME |

Primary Examiner—Stephen J. Tomsky
Attorney—Peter S. Gilster et al.

[57] ABSTRACT

Audience response to a presentation is measured by a method involving establishing a plurality of circuits through the audience, providing the audience members with switch means operable by the member for switching a respective circuit and making the presentation to the audience with the members then operating their respective switch means during the presentation at a rate estimated to reproduce the predetermined constant rate. Thereafter, during the presentation, the switching of each of the circuits caused by each of the members is recorded, and the recorded rate is then compared with the predetermined constant rate so as to derive from the difference between these rates a measure of audience response to the presentation.

Apparatus of the invention includes a plurality of circuits through the audience, and a plurality of switch means each connected with corresponding ones of the circuits and each operable by an audience member for switching the corresponding circuit, the rate of switch operation being at a rate determined by the member to reproduce a predetermined constant rate of switch operation. The apparatus includes a device such as a strip chart recorder which is responsive to the switching of each circuit for determining the actual rate of switch operation during the presentation.

6 Claims, 5 Drawing Figures 3,776,453

AUDIENCE RESPONSE MEASUREMENT METHODS AND APPARATUS

BACKGROUND OF THE INVENTION

This invention relates to methods and apparatus for measuring the audience response to a presentation made to the audience, and more particularly to such methods and apparatus providing a quantitative measurement of such response in a highly objective rather than subjective manner.

Heretofore, systems have been proposed in which the members of an audience are provided with suitable devices for signalling their subjectively determined reaction to a performance during the course of its presentation to the audience. Typically, for example, members of the audience register varying degrees of interest or disinterest, approval or disapproval or similar personal reaction to a presentation such as a radio or television program. In one such prior art system, individual members of the audience are provided with individual switch boxes, each having a plurality of switches connected in a resistance network. One of the switches is depressed to indicate the member's degree of interest in a presentation. The responses of the individual members are weighed together by detection of changes in resistance of the network and the results recorded on a strip chart as evidence of the overall audience degree of interest.

In another prior art system in which each member of the audience similarly has a switch box with a plurality of switches to indicate degree of interest or enjoyment the audience members are periodically signalled to operate their switch boxes and the overall of net result of the operation of all the switch devices is recorded on a chart or record to provide indication of overall subjective reaction of the audience at periodic intervals.

These and other prior art systems have, in general, been characterized by operation in response to a subjective determination by members of the audience of their own extent of pleasure, enjoyment or interest in a presentation. Such a subjective indication is not genuinely or accurately determinative of how audience members react psychologically or naturally to media presentations and is, in fact, only a qualitative indication of audience response to the presentation. In contrast, the present invention provides highly objective determination of audience response to a presentation and can be used to quantitatively measure, on an accurate statistical basis, the audience response to the presentation.

In a way much more effective than prior art systems, the invention allows, for example the determination and quantitative prediction of which of a series of shows, films or other presentations will be most interesting and pleasing to a mass audience; or which portions or segments of a presentation will be most interesting or pleasing to a mass audience. Moreover, the invention allows statistical determination and quantitative predictions of which kinds of persons will like or dislike a particular show, film or other presentation, or even a particular portion or segment of the show, film, or other presentation.

The invention involves the measurement, in effect, of time as it is perceived or sensed by members of the audience. The invention takes into account the fundamental difference between real or clock time and human psychological time, i.e., one's sense of time. This difference is that the passage of real time is characterized by a constant and invariable rate, while the sense of time (i.e., the passage of time as it is perceived) is subject to variation according to one's involvement or interest in an activity. Thus, each of us experiences or senses time differently so that one may upon occasion say that "time has passed swiftly" while upon another occasion one may say that "time has dragged by." That is to say, one's estimation or sense of time varies, whereas real or clock time is invariable and constant. We commonly sense that time has passed swiftly for us when we are engaged in interesting or pleasing mental or physical activities. Conversely, we sense that time has passed slowly for us when engaged in uninteresting or displeasing mental or physical activities.

When members of an audience are exposed to a presentation such as a show or film, their perception of the passage of time depends on whether they find the presentation pleasing or interesting as compared with displeasing or uninteresting. In accordance with the invention, this perceived passage of time (i.e., "human" time as compared with "clock" time) is quantitatively measured and utilized as a measure of the audience response to the presentation.

The invention is thus to be contrasted with the prior art of which the following U.S. Pats. are representative: Nos.: 2,514,086; 2,674,512; 2,712,976; 2,833,859; 2,878,996; 2,923,771; 2,924,496; 2,957,046; 3,034,500; 3,093,795; 3,210,472; 3,318,517; 3,319,254; 3,328,803; 3,399,271; and 3,502,813.

SUMMARY OF THE INVENTION

Among the several objects of the invention may be noted the provision of improved methods and apparatus for measuring audience response to a presentation made to the audience; the provision of such methods and apparatus in which the audience response to the presentation is objectively and statistically determined rather than subjectively and qualitatively determined; the provision of such methods and apparatus which do not require subjective decision making on the part of members of the audience whose response to the presentation is being measured but which instead provide for quantitative measurement of audience response; the provision of such methods and apparatus providing for comparison of the audience response to various portions or segments of a presentation and providing for indication of changes in audience response during the course of a presentation; the provision of such methods and apparatus permitting comparison between the response of different groups of an audience to which a presentation is made; and the provision of such methods and apparatus which are relatively simple, straightforward in use, and which provide dependable results.

Briefly, a method of measuring audience response to a presentation made to the audience which is preferred involves first establishing a plurality of circuits through the audience, then providing members of the audience with respective switch means, each of which is operable by the members for switching a respective one of the circuits. The audience is then said to be "time standardized" by demonstrating to the audience members prior to the presentation a predetermined constant rate of operation for the switch means. Following the demonstration and prior to the presentation, the members then operate for a preselected period of time (such as 5 minutes) their respective switch means at a rate estimated by them to reproduce the predetermined rate of operation. During this period of time, the switching of each of the circuits is recorded (as by means of an event recorder) so as to record a pre-presentation rate of operation of the respective switch means. The presentation is then made to the audience, the members of the audience then operating their respective switch means during the presentation, again at a rate of operation estimated by them to reproduce the predetermined rate of operation. Also during the presentation, the switching of each of the circuits is also recorded. Thus, there is recorded a during-presentation rate of operation of the respective switch means. Finally, the recorded prepresentation rate of operation is compared with the during-presentation rate in order to derive from the difference between these rates a quantitative measure of audience response to the presentation.

Such a method requires apparatus comprising a plurality of circuits through the audience and a plurality of switch means such as individual push-button switches for members of the audience, each connected with a corresponding circuit. Each of the push-buttons is operable by a member of the audience for switching corresponding circuits and is operated by the audience member at a rate of operation determined by the member to reproduce the predetermined constant rate of operation. Means such as a multi-channel event recorder is responsive to the switching of each of the circuits, thereby providing for determination of the rate of operation of the switch means during the presentation.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
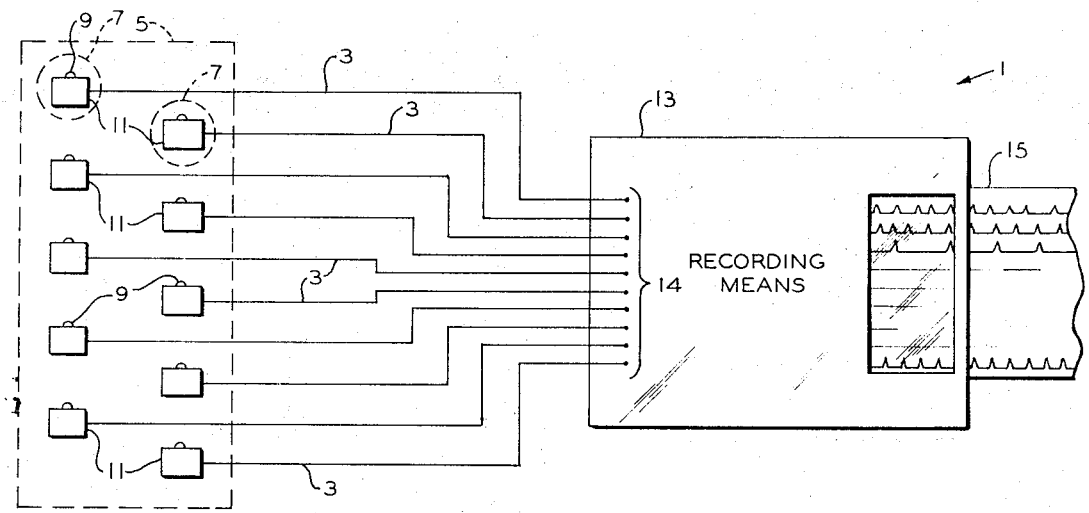
FIG. 1 is a schematic representation of audience response-measuring apparatus of the invention.
Figure 2:
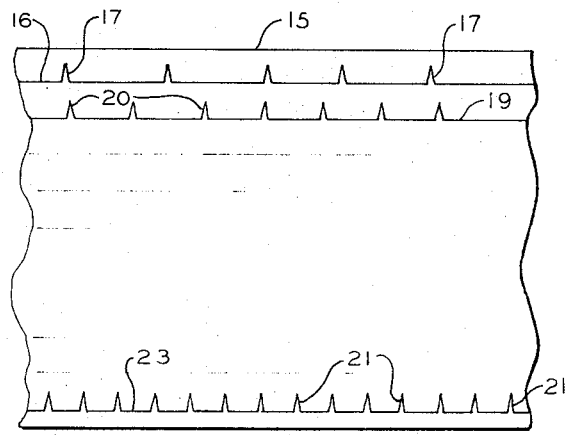
FIG. 2 is a depiction of a portion of a strip chart produced by an event recorder forming part of the FIG. 1 apparatus and useful in explaining the invention.

Referring now to the drawings and more particularly to FIGS. 1 and 2, apparatus according to a first embodiment of the invention, designated generally by the reference number 1, includes a plurality of circuits 3 extending through an audience 5 of several person before whom will be made a media presentation, such as a television production, a motion picture film segment or selection, or any other medium as to which it is desired to evaluate audience reaction or response. Thus it will be understood that individual members may be seated at positions such as those representatively indicated at 7.

Each such circuit 3 may consist of a pair of leads and is interconnected with a pushbutton switch 9 operable by a member at one of the positions 7. For this purpose, each such switch 9 is enclosed in a suitable enclosure 11 or may be mounted in an arm of the chair, etc., so as to be readily depressed by the audience member. The switches 9 may each be of a normally open, momentary-close type, for example, so as to momentarily complete or otherwise switch the circuit 3 with which it is interconnected.

It will be seen that each switch 9 corresponds with one of the circuits 3 and is operated by a member of the audience 5 at a rate of operation determined by the respective member to reproduce a predetermined rate of operation. Such operation is explained herein below.

Interconnected with each of the circuits 3 at a suitable remote location is a means 13 which is responsive to the switching of each of the circuits for providing determination of the rate of operation of the several switches 9 during the presentation. Means 13 advantageously may comprise, as represented, a multichannel event recorder for recording the switching of each of circuits 3 as a function of time. The event recorder 13 may be of a conventional strip chart type with the circuits connected to respective input channels collectively represented at 14 and adapted to produce on a strip chart 15 or recording material such as paper a record of the switching in each circuit 3 resulting from operation of the respective pushbutton switch 9.

Referring to FIG. 2, a length of the strip 15 is enlarged to show traces on the strip corresponding to each of circuit 3. For example, a trace 16 includes marks 17 or other suitable indications which are made by the event recorder in response to operation of one of switches 9 by an audience member, a mark 17 being recorded each time the switch 9 is depressed. A second trace 19 includes marks 20 indicating each operation of the respective switch 9 by another member of the audience. Only two of the several traces have been illustrated for simplicity.

Because it is the operation, i.e., depressing, of each switch 9 rather than the duration of its operation which is recorded, the switches 9 may be regarded as impulse devices. That is, their operation provide impulses and it is these impulses which are recorded.

Also recorded on strip 15 are the marks 21 of a time trace 23 corresponding to clock time. Such marks 21 indicate intervals of time such as each minute, 10 minutes, fifteen minutes and so forth, as may be appropriate. There may instead be vertical lines on strip 15 which, with knowledge of the linear speed at which the strip moves, serve to indicate the passage of clock time. Such lines or time trace 21 are useful for determining not only the average rate of operation of the individual switches 9 but also changes in the rate of switch operation during the course of the presentation. Provision may be included for recording also on the strip 15 the time of day.

Operation of the apparatus for the purpose of measuring audience response to a presentation made to the audience involves a method involving first establishing the circuits 3 through the audience to whom the presentation is to be made and providing members of that audience with the switches 9 so that each such switch can be operated by a member of the audience for switching a respective one of the circuits.

Random sampling of the response of audience members may be sufficient. In that case, only certain members of a relatively large audience may actually operate switches interconnected by means of circuits 3 with recorder 13. However, if desirable, each member of such a large audience may have a switch to operate with some of the switches then being dummies and not interconnected through a circuit 3 to recorder 13.

Regardless of the size of the audience 5 or the number of members whose response to a presentation (as manifested by operation of the switches 9) is actually recorded, the present method preferably includes the step of "time-standardizing" the audience prior to making the presentation. That is to say, the audience is given a specific time interval (e.g., 15 seconds) as a standard unit. This interval is suitably demonstrated to the members of the audience and they are instructed that the interval is to be reproduced by operation of their respective switches 9. Such demonstration may involved simply having the audience members operate their switches in unison on command at the predetermined constant rate. In this way the audience is given a "feel" for the given interval such as 15 second (providing a switch operation rate of 4 times per minute).

The audience members are then asked to reproduce this same interval (i.e., the predetermined constant rate of operation which was demonstrated) for a preselected period such as 10 or 15 minutes. This reproduction period is not revealed to the audience, lest the members determine just how many switch operations would be necessary to give a perfect rate of operation if averaged over the period. During this reproduction period, the switching of circuits 3 is recorded by recorder 13. In this way, the strip chart is used to determine, and provides a record of, a pre-presentation rate of operation for each member of the audience who is operating one of the switches interconnected with recorder 13. Similarly, a rate of operation which is average for a portion of the audience, or even for the entire audience, can be determined.

The presentation, e.g., film or television program segment, etc., is then made to the audience, the audience members having first been instructed to operate their switches 9 while watching and listening the presentation so as to reproduce during the presentation the predetermind constant rate of operation (i.e., so as to reproduce the given interval of 15 seconds, for example). Thus the audience members operate their switches at a rate estimated by the members to reproduce the predetermined rate previously demonstrated to them. As the presentation takes place, recorder 13 is operated to again record the switching of the circuits 3. In effect, this records a during-presentation rate of operation of the respective switches 9 by the audience members as they endeavor to reproduce the predetermined rate. The recording is teminated after a length of time (such as 10—15 minutes) again not previously made known to the audience.

Having thus recorded rates of switch operation for each of the participating audience members under both pre-presentation and during-presentation conditions, the rates for each member (or for the members averaged together) are then compared. From the difference between the compared rates may be derived a quantitative measure for each audience member (or for the entire audience when averaged together) of response to the presentation.

For example, study of the strip chart produced by recorder 13 may reveal that the pre-presentation rate of switch operation for one of the members was 5.3 operations (or impulses)/min. as compared with a predetermined constant rate of 4 operations/min. previously demonstrated to the audience. The during-presentation rate for that member may be 6.2 operations/min. or a difference of 0.9 operations/min. (or 17 percent faster) as compared with the pre-presentation rate for that member. This indicates that the member was relatively uninterested in the presentation and so tended to operate his switch at a greater rate. That is to say, time seemed to pass slowly for this individual during the presentation and his under-estimation of the switch operation interval reflects this.

Another member of the audience may operate his switch during the presentation at a rate such as 35 percent slower than his pre-presentation rate, indicating a considerable degree of interest in the presentation. In other words, time seemed to pass relatively quickly for this person and he tended to over-estimate the switch operation interval. The comparison between pre-presentation and during-presentation rates may be made in other ways as well as in accordance with the use to be made of the data.

In any event, the results of the recording during the presentation (as reflected by a switch operation rate expressed in terms of clock time) represent a variable which is compared with a pre-presentation rate (also expressed in terms of clock time) which is representative of the human sense of time of the participating audience members. Thus, each member's own sense of time, in effect, becomes a constant to which the variable is compared.

It should be noted that the pre-presentation switch operation rates for all of the participating audience members may be averaged together to provide a single figure to which is compared an average of the during-presentation switch operation rate for all such members. Where large members of persons are so participating, the recorder 13 may advantageously be constituted by a computer of sufficient size to handle the required calculations involved in making averages of the switch operation rates. Thus, the results may be calculated by appropriate digital or analog techniques and printed out by the computer. It will be apparent, of course, that the average switch operation rate for any member or for the audience as a whole may be expressed either in terms of operations per unit of time or in terms of the average interval (i.e., the period) between operations.

Figure 3:
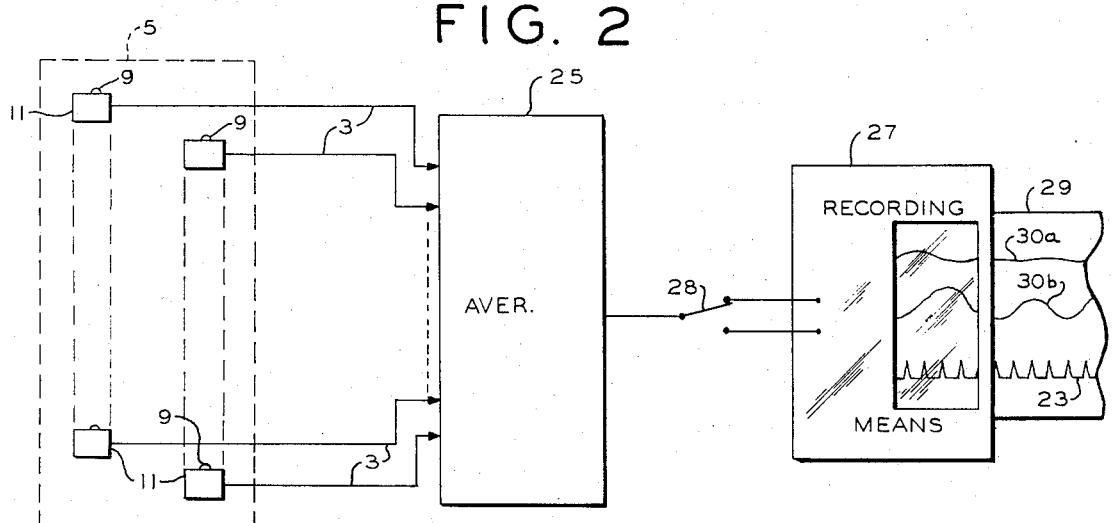
FIG. 3 is a block diagram of an alternative embodiment of the system useful for obtaining a record of an average response to a presentation made to the audience.

In FIG. 3, the invention is depicted as an embodiment in which an averaging means 25 is included as part of the apparatus. Means 25 may be any suitable analog or digital calculating device which is responsive to the switching of each of circuits 3 by operation of switches 9 and from such switching provides an output signal which is the average rate of switching of all of the circuits 3. This signal is supplied to a strip chart recorder 27 of the type providing a trace whose position along the y-axis (i.e., transverse to the direction of movement of the strip chart) varies as a function of the amplitude of the input signal.

A two-position switch 28 permits switching the output signal to one or the other of two of the recorder's input channels. Thus the strip 29 may have a first trace 30a recording the average rate of switching prior to a presentation and can be rolled back to have a second trace 30b recorded thereon representing the average rate during the presentation. A time trace 23 may be provided as before, or grid lines on the strip may serve as a record of clock time passage when the strip linear speed is taken into consideration.

Figure 4:
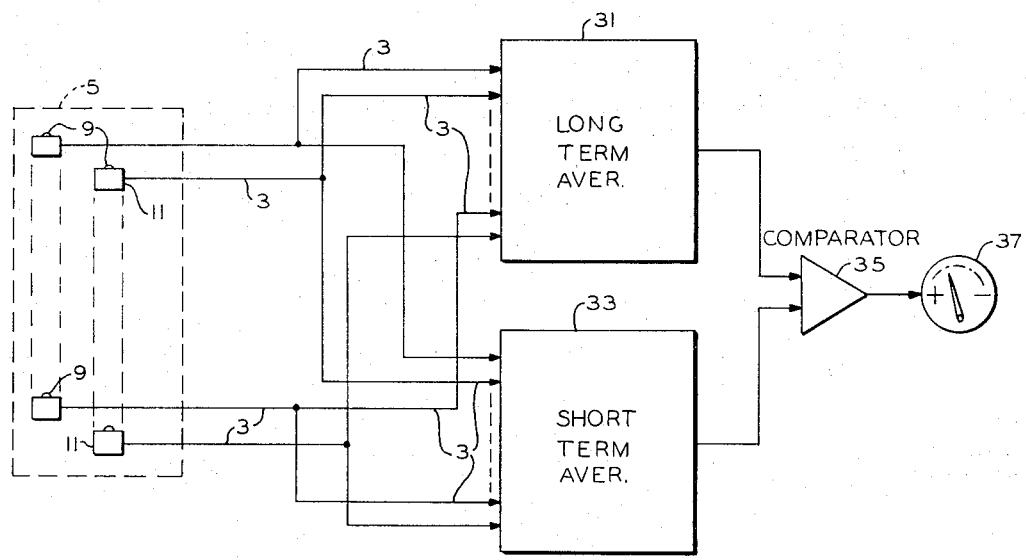
FIG. 4 is a block diagram of another embodiment of the system useful for determining changes in audience response throughout the presentation.

Another possible embodiment is represented in FIG. 4 wherein the circuits 3 are interconnected to each of a pair of averaging means 31 and 33 of the same type as that in FIG. 3. Here the first averaging means 31 determines the average switching rate over or with respect to a relatively long time base (such as several minutes), providing an output signal representative of this long-term average, while the second averaging means 33 determines the average switching rate over, i.e., with respect to, a shorter time basis such as one minute or so, and provides an output signal representative of the short-term average. These two output signals may be compared by a conventional comparator 35 (such as of the linear integrated circuit type). The results of such comparison are indicated by a meter 39 which may provide simply a "+" or "−" indication as shown.

This arrangement serves to indicate changes in audience response as these changes occur during a presentation. That is, any short-term change in average response, such as increased interest (resulting in a decreased switching rate), is compared with the long-term average response, would be indicated by meter 37. Short-term increased interest in the presentation would be indicated by a "+" reading and short-term decreased interest would be indicated by a "−" reading. Of course, it will be seen that the long-term average with which the short-term average is compared may be that determined from previous audiences or may even be an arbitrarily established long-term average, i.e., a constant. Other variations of this embodiment providing comparison of averages having different time bases are also possible. Of course, recording by means of a chart recorder as in FIG. 3 or an event recorder as in FIG. 1 may additionally be employed.

Figure 5:
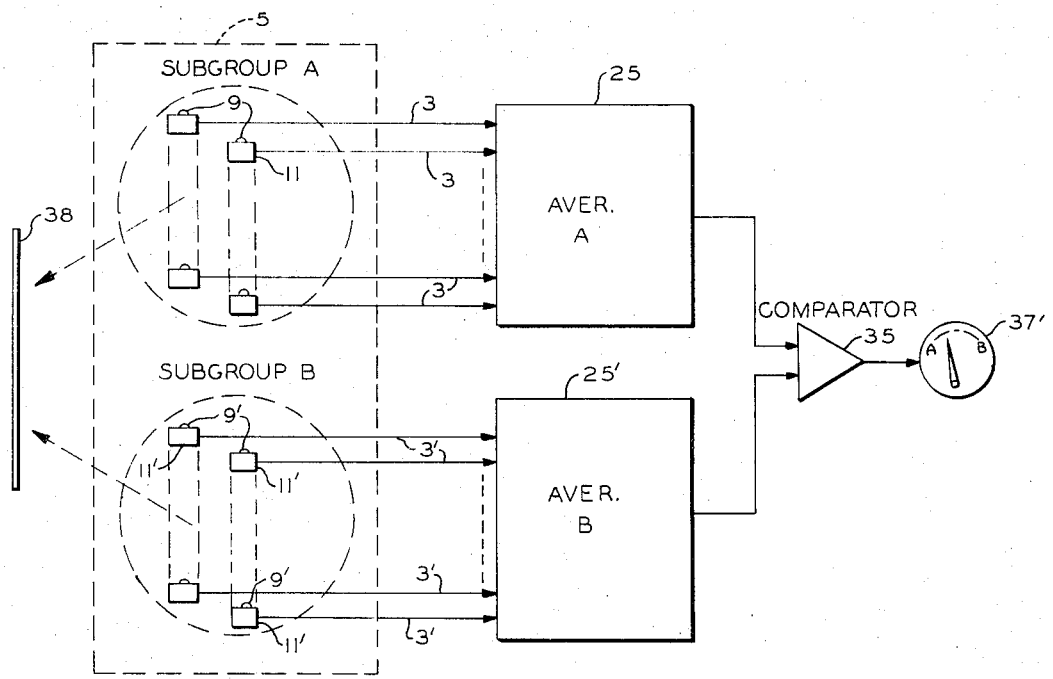
FIG. 5 is a block diagram of yet another embodiment of the system useful for comparing the response of different groups of an audience to whom the presentation is made.

FIG. 5 represents another embodiment of the invention for comparing the response of two subgroups A and B of audience 5, both subgroups being presented with the same presentation as here represented by a single motion picture screen 38. Switches 9, operated by members of subgroup A, are interconnected by leads 3 with a first averaging means 25 and switches 9, operated by members of subgroup B, are interconnected by leads 3' with a second averaging means 25' identical to means 25. As in the embodiment of FIG. 3, each of means 25 and 25' supplies an output signal which is a function of the average rate of switching of the respective switches 9 and 9'. These two output signals are compared by comparator 35. Meter 37' provides a relative indication of which of the two subgroups A and B has a great (or lesser) switching rate and thereby indicating which group shows less (or greater) interest in the presentation.

This embodiment makes possible the comparison of audience members grouped according to various criteria, such as age, occupation, income, sex, inter alia. Thus, aduience members of a first age group may constitute subgroup A and those of a second age group may constitute subgroup B. During a presentation, it may be noted which of the two subgroups shows greater interest, enjoyment, etc., in a particular segment of a presentation. Additionally, the results of the averaging may be recorded, if desired, as in FIG. 3 or the actual switching may be recorded as in FIG. 1 to provide a permanent indication or further analysis of audience member response.

The present invention may be used to great advantage in comparing one media presentation with another presentation. Thus, the average switching rate may be determined for the audience when presented with a first program and can be compared with the average rate determined for the same audience when presented with a different second program. Of course, such average rates may be compared with the average obtained during the audience "standardizing" during which the audience members endeavor to operate at a demonstrated preselected switching rate in the absense of any presentation.

The invention makes possible also the detection of patterns of audience interest or disinterest occurring during a presentation. Thus, during one segment of a presentation, the audience members may "overimpulse," i.e., operate their switches at a relatively high average rate resulting from underestimation of the proper switch operation interval. This evidence that, for such audience members, time is passing relatively slowly and who are, therefore, relatively disinterested in (or are not enjoying) the segment. During another segment, the audience may "underimpulse." That is, the members may overestimate the proper switching interval and thus produce a relatively low average rate of switch operation. This is evidence that, for such members, time is passing relatively quickly. Such members are, therefore, relatively interested in (or are enjoying) the segment.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A method of measuring audience response to a presentation made to the audience, comprising:
   establishing a plurality of circuits through the audience;
   providing members of the audience with respective switch means, each said switch means being operable by the member for switching a respective one of the circuits;
   making said presentation to the audience, said members of the audience operating their respective switch means during the presentation at a rate of operation estimated by said members to reproduce a predetermined constant rate of operation for each switch means;
   recording during the presentation the switching of each of said circuits caused by said members of the audience thereby to record the rate of operation of the respective switch means during the presentation; and
   comparing the recorded rate of operation of the respective switch means with said predetermined constant rate thereby to derive from the difference between the recorded and predetermined rates a measure of audience response to the presentation.

2. A method of measuring audience response as set forth in claim 1 further comprising demonstrating to said members of the audience prior to the presentation said predetermined constant rate of operation for each switch means.

3. A method of measuring audience response as set forth in claim 1 comprising recording also the passage of clock time during said presentation and comparing the recorded clock time with the recorded rate of operation of the respective switch means thereby to measure changes in audience response occurring during the presentation.

4. A method of measuring audience response as set forth in claim 1 wherein:
following said demonstrating and prior to making said presentation, said members of the audience operating for a preselected period of time their respective switch means at a rate of operation estimated by said members to reproduce said predetermined rate;
recording during said period the switching of each of said circuits thereby to record a pre-presentation rate of operation of the respective switch means; and
comparing the recorded pre-presentation rate of operation with said rate of operation recorded during said presentation thereby to derive a quantitative measure of audience response to the presentation.

5. A method of measuring audience response as set forth in claim 1 further comprising averaging the rate of switching of a plurality of said circuits thereby to determine the average rate of operation of said switch means by a corresponding plurality of said audience members.

6. A method of measuring audience response to a presentation made to the audience, comprising:
establishing a plurality of circuits through the audience;
providing members of the audience with respective switch means, each said switch means being operable by the member for switching a respective one of the circuits;
demonstrating to said members of the audience prior to said presentation a predetermined constant rate of operation for each switch means;
following said demonstrating and prior to said presentation, said members operating for a preselected period of time their respective switch means at a rate estimated by said members to reproduce said predetermined rate;
recording during said period the switching of each of said circuits thereby to record a pre-presentation rate of operation of the respective switch means;
making said presentation to the audience, said members of the audience operating their respective switch means during the presentation at a rate of operation estimated by said members to reproduce said predetermined rate;
during the presentation recording the switching of each of said circuits thereby to record a during-presentation rate of operation of the respective switch means; and
comparing the recorded pre-presentation rate with the recorded during-presentation rate thereby to derive from the difference between the compared rates a quantitative measure of audience response to the presentation.

* * * * *